No. 887,975. PATENTED MAY 19, 1908.
A. R. STEVENS.
MACHINE FOR TOPPING BEETS.
APPLICATION FILED FEB. 13, 1908.
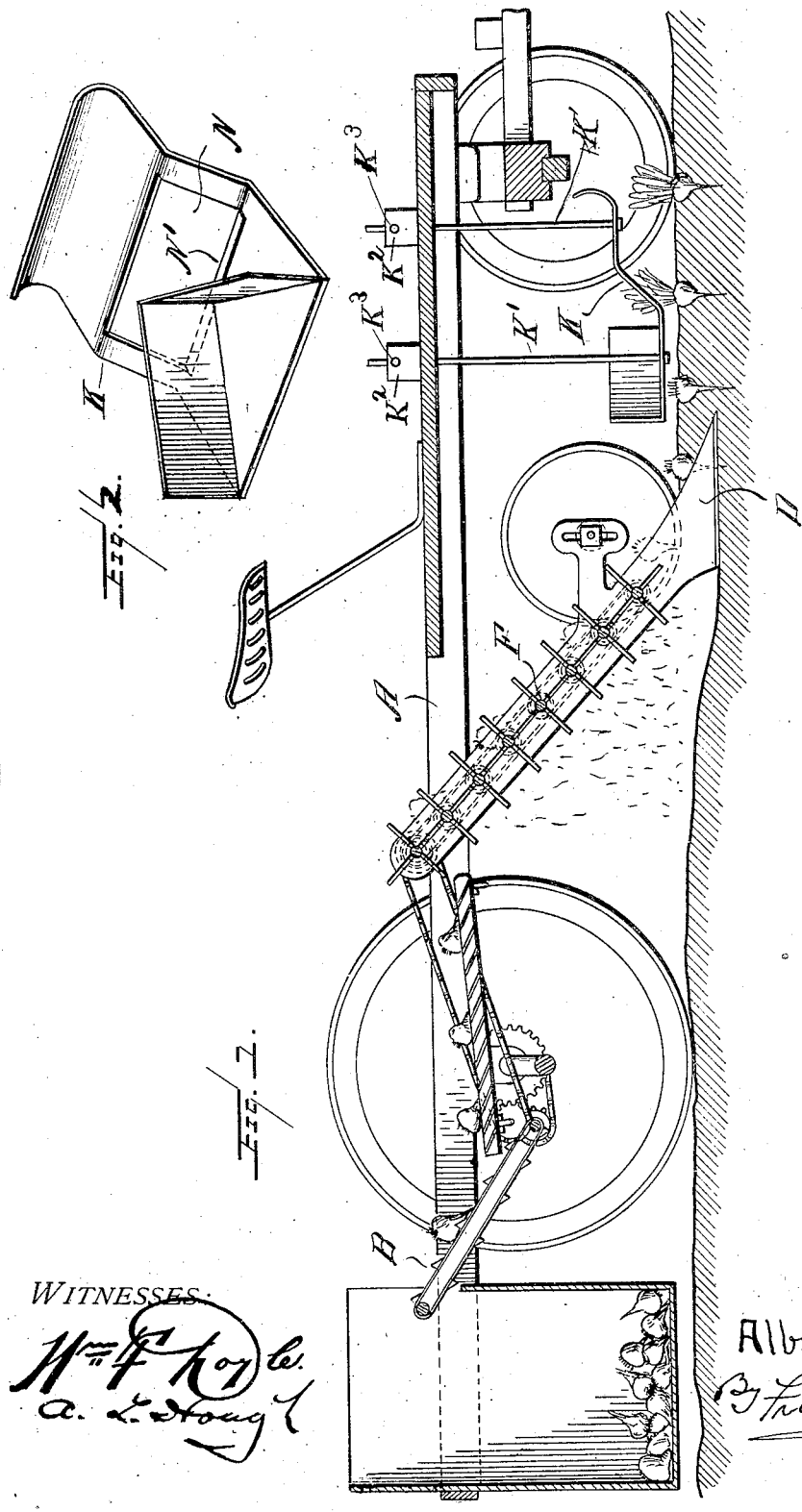
WITNESSES
INVENTOR
Albert R. Stevens
Attorney

UNITED STATES PATENT OFFICE.

ALBERT REESE STEVENS, OF BELMORE, OHIO.

MACHINE FOR TOPPING BEETS.

No. 887,975.

Specification of Letters Patent.

Patented May 19, 1908.

Application filed February 13, 1908. Serial No. 415,771.

*To all whom it may concern:*

Be it known that I, ALBERT REESE STEVENS, a citizen of the United States, residing at Belmore, in the county of Putnam and State of Ohio, have invented certain new and useful Improvements in Machines for Topping Beets; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for topping beets and the object of the invention is to produce a simple and efficient apparatus of this nature which, when being drawn over the ground, will first sever the top of a beet, loosen the root and elevate the same to be deposited in any suitable receptacle.

The invention comprises various details of construction, combinations and arrangements of parts which will be hereinafter fully described and then specifically defined in the appended claims.

I illustrate my invention in the accompanying drawings, in which:—

Figure 1 is a side elevation of the machine. Fig. 2 is an enlarged detail view showing the means for severing the top from the beet.

Reference now being had to the details of the drawings by letter, A designates the frame of the apparatus having an elevator B, which is operated by gear connections with the driving wheels. At the forward end of the frame are mounted the plows D spaced apart and having their forward edges beveled and adapted to loosen the beet from the ground after the top has been severed therefrom. Immediately at the rear of said plow is an elevator F up which the beets are raised to be deposited in any suitable receptacle, all of which is of ordinary construction common in apparatus of this nature. Immediately in front of the plow is the topper plate, designated in the drawings by letter K, said plate being preferably curved as shown and provided with an opening N, the lower marginal edge of which N' is formed into a cutting blade against which the top of the beet draws to sever the same as the machine passes over the ground. Headed rods K' pass through the bosses K² upon the frame and are held by set screws K³, said rods serving to support the plate K. As the top of the beet is severed, it is thrown to one side and the plow loosens the beet which is raised by the elevator having fingers thereon and deposited in a receptacle provided for the reception of the beet.

From the foregoing, it will be noted that, by the provision of an apparatus as shown and described, a simple and efficient means is afforded whereby the tops of beets may be severed while the root of the beet is still securely held in the ground, after which the plow following will loosen and uproot the beet which is caught by the fingers of the elevator and hoisted to and deposited in a receptacle. By the provision of an apparatus as shown and described, it will be noted that the beets may be quickly harvested without the necessity of first loosening and severing the tops by manual labor, thus greatly expediting the gathering of the beets.

What I claim to be new is:—

1. An apparatus for topping beets comprising a frame, a plate depending therefrom and provided with an opening, the marginal edge of which opening forms a cutting blade designed to sever the tops of beets as the plate is moved, as set forth.

2. An apparatus for topping beets comprising a frame, a curved plate depending from the frame and having an opening therein, the marginal edge of which is formed into a cutting blade, as set forth.

3. An apparatus for topping beets comprising a frame, a plate, rods secured to said plate and held by said frame, the plate having an opening, the marginal edge of which is formed into a cutting blade, a V-shaped deflector upon said plate having its apex adjacent to the opening therein, as set forth.

In testimony whereof I hereunto affix my signature in the presence of two witnesses.

ALBERT REESE STEVENS.

Witnesses:
   GEO. C. WALTEMIRE,
   GEO. DULL.